July 21, 1959     A. BRUEDER     2,896,195
INDICATOR OF ENGINE CONDITIONS IN MOTOR VEHICLES
Filed Nov. 1, 1955     2 Sheets-Sheet 1
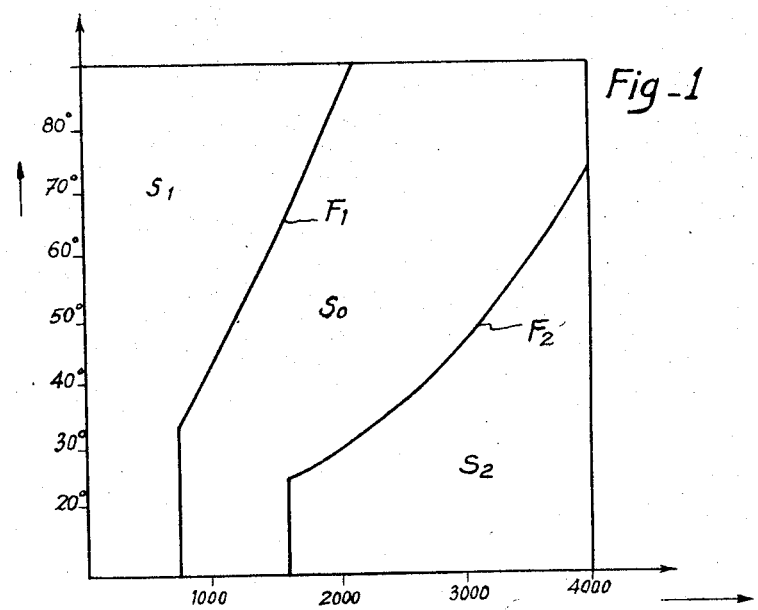
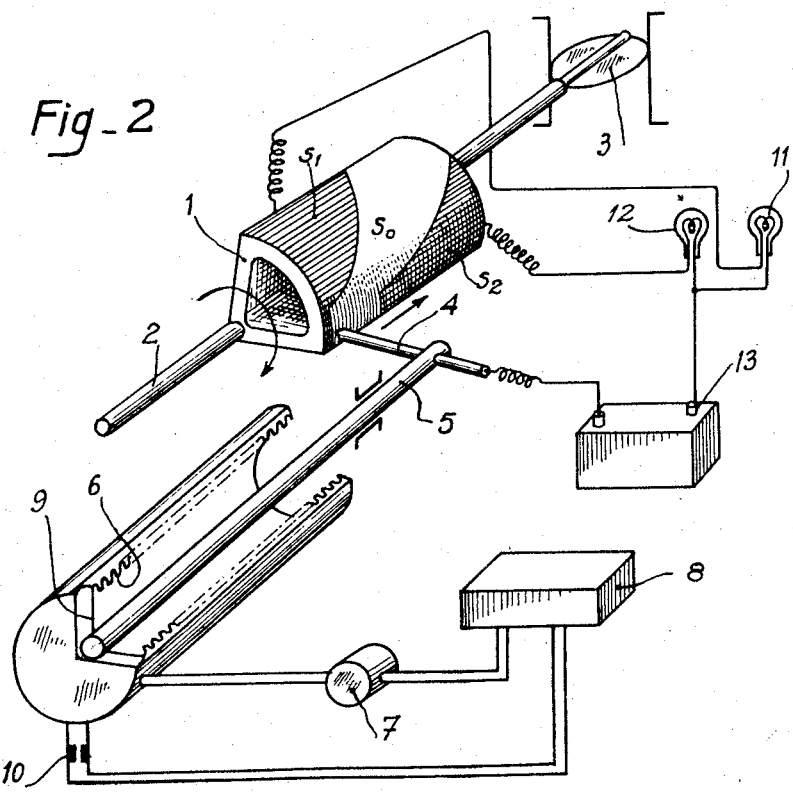

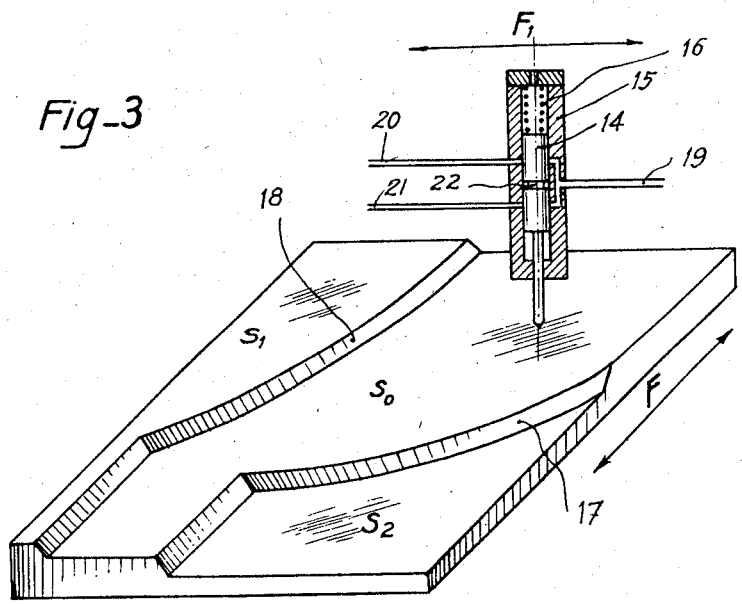
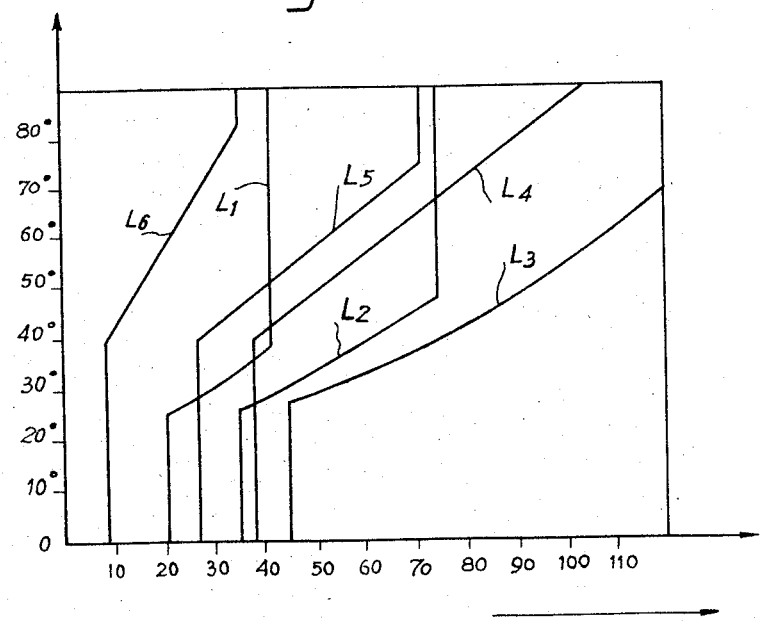

United States Patent Office 2,896,195
Patented July 21, 1959

2,896,195

INDICATOR OF ENGINE CONDITIONS IN MOTOR VEHICLES

Antoine Brueder, Paris, France, assignor to Societe Anonyme Andre Citroen, Paris, France, a corporation of France Application November 1, 1955, Serial No. 544,335

Claims priority, application France November 6, 1954

2 Claims. (Cl. 340—213)

This invention relates to improvements in indicators of engine conditions in motor vehicles.

Internal combustion engines used to-day on motor vehicles function under economic conditions, from the point of view of fatigue and efficiency, only within a rather restricted range of a transmission ratio; it is therefore advantageous to provide a signal whereby the driver will be given an indication of the instant when a change of the transmission ratio would be advantageous.

The main object of the invention is to provide an indicating apparatus which is intended to give a signal showing that it is advantageous to effect an operation for change of speed, that is to say of the transmission ratio. This signal can be utilised either as an indication to the driver, in the case of a manually controlled motor vehicle, or as an initiation of the process ensuring the passing to a new ratio in the case of an automatically operated motor vehicle transmission.

The running state of an internal combustion engine may be defined by several parameters. Speed of rotation and the degree of opening of the throttle will be used for preference, but other factors such as the depression, moment of load could be used.

For a given engine power output and vehicle speed, an internal combustion engine connected to a staged-ratio gearbox functions under different conditions in accordance with the transmission ratio used. From the point of view of fatigue and efficiency the most advantageous ratio can be determined for each case of use experimentally and by the characteristic curves of the engine. The main object of the present invention may therefore be expressed as to provide a device for initiating a signal as soon as the engine no longer functions under the best conditions compatible with the power output required and the transmission ratios available from the gearbox.

According to the invention a device for indicating the necessity of changing gear or transmission ratios comprises a movable surface or grid on which is traced a diagram delimiting the regions corresponding to the use of various transmission ratios, and by a feeler, these two elements being movable separately under the action of characteristics such as speed and degree of feed and being constituted in such manner as to produce an appropriate signal when the feeler crosses curves marked on the diagram.

In order that the invention may be more clearly understood, constructions in accordance therewith will now be described with reference, by way of example, to the accompanying drawings in which:

Figure 1 is a graphic representation of the opening of the engine throttle (as ordinate) depending on the engine speed (as abscissa) different zones being traced on said diagram, the origin of the graph corresponding to idling of the engine;

Figure 2 is a diagrammatic perspective view of a grid and feeler unit;

Figure 3 is a diagrammatic view of a grid intended to co-operate with a hydraulic or pneumatic feeler; and Figure 4 is a graph showing the opening of the throttle (as ordinate) depending on the speed of the vehicle (as abscissa) curves corresponding to the changes of the transmission ratios being traced thereon.

Referring to Figure 1, the grid takes the form of a curve which is traced on a surface movable in translation and on which the abscissa represents the parameter ensuring the movement of this surface, the engine speed or the speed of the vehicle, and the ordinate represents the parameter acting on a means remaining in contact with the surface called the feeler, this parameter being, for example, the coefficient of admission of the gases. On this diagram are traced curves $F_1$ and $F_2$ which are judiciously selected taking into account the characteristics of the engine and those of the gearbox, such that they divide the surface into three zones in relation to the axes o—x, o—y.

The zone $S_0$ corresponds to the admissible operating points (opening of the gases in dependence on the speed of the engine);

The zone $S_1$ delimits the operating points for which it is necessary to reduce the transmission ratio, that is to say select a "lower" speed;

The zone $S_2$ delimits the operating points for which it is necessary to increase the transmission ratio, that is to say select a "higher" speed.

One of the characteristics of the invention lies in the fact that this diagram is utilised directly, and in having responses corresponding exactly to the curves $F_1$ and $F_2$.

The feeler is preferably formed by a suitable contact finger which is movable in relation to the surface and is driven parallel to the y-axis (ordinate) while the grid surface is driven parallel to the x-axis (abscissa); as has been stated, this movement of the feeler will, for example, be effected depending on the opening of the throttle.

In this way the relative displacement of the grid and the feeler (Figure 2) indicates the point during operation of the vehicle corresponding to the two parameters selected and it is the contact of the feeler finger with one of the zones $S_1$ or $S_2$ formed on the surface that gives the signal indicating the need to change the transmission ratio; this signal may be of an electrical, mechanical, hydraulic, magnetic or some other nature; in the embodiment shown in Figure 2, the feeler on the one hand and the zones $S_1$ and $S_2$ on the other hand, produced by a conducting material on an insulating surface, are connected respectively to a terminal of an electrical circuit containing a source of voltage and a signal apparatus, or else a relay or a motor itself initiating the speed change operation.

This arrangement has the advantage of enabling the zone delimiting curves $F_1$ and $F_2$ to be used directly, taking into account engine consumption and performance considerations.

Referring to Figure 2, it will be seen that the grid has the form of a cylindrical sector 1 disposed on the rod linkage 2 connecting the accelerator pedal to the carburetter of the engine and which consequently moves in accordance with the degree of opening of the throttle 3.

On the surface of this cylindrical sector are traced the predetermined curves $F_1$ and $F_2$ which delimit the zones $S_1$, $S_0$, $S_2$. The surface of the zone $S_0$ is covered with insulating material; the surface of the zones $S_1$ and $S_2$ is constituted by conducting material.

The zones $S_1$ and $S_2$ are connected to two signal lamps 11 and 12, these lamps in turn being connected to one of the terminals of the battery 13, the other terminal of which is connected to the feeler 4.

The feeler 4 is carried by a cylindrical rod 5, which moves in accordance with the variations of the engine speed. This feeler 4 always remains in contact with the grid and its point of contact represents at each instant the state of operation of the engine depending on the two parameters selected.

In the construction shown in Figure 2, the displacement of the feeler 4 is ensured by the compression of a metallic bellows 6 on which acts the pressure of a fluid; this pressure is provided by a pump 7, the speed of rotation of which is linked to that of the engine and which transmits the fluid from a reservoir 8 to behind a piston 9, whence it returns to the reservoir 8 through a calibrated nozzle 10.

In operation, when the point of contact of the feeler on the grid is situated in the zone $S_0$, the two lamps 12 and 13 are extinguished. As soon as the feeler touches one of the zones $S_1$ or $S_2$, the corresponding lamp lights.

In an automatic transmission, the lamps can be replaced by relays acting on a small electric motor capable of running in both directions, and controlling the speed transition selector.

In another embodiment shown in Figure 3, the grid and the feeler always move under the action of the parameters, opening of the throttle and engine speed, but the feeler is constituted by a small piston valve 14 movably disposed in a cylinder 15 and loaded downwardly by the action of a spring 16. The grid is no longer a plane or cylindrical surface, but comprises several parallel planes or "floors" corresponding to the three zones $S_0$, $S_1$, $S_2$. The various "floors" of the grid are separated by ramps 17 and 18, so as to enable the feeler to move over the whole of the grid. The latter is moved parallel to the arrow F in either direction.

Several pipelines terminate at the cylinder 15; the pipeline 19 is connected to a source of fluid under pressure, the pipelines 20 and 21 respectively control the "rise" or "fall" of the speeds, through the medium of a hydraulic servi-control, when they are fed with the fluid under pressure. The feeler moves in accordance with the speed of the engine parallel to the arrow $F_1$ perpendicular to F, in either direction.

When the feeler is on the zone $S_0$, the piston ensures the separation of the pipelines 19, 20 and 21. If on relative movement of the feeler and the grid the feeler engages the zone $S_2$, the piston falls and ensures, through a throat 22, that the pipeline 21 is put under pressure from the pipeline 19. If, on the other hand, the feeler engages the zone $S_1$, the pipeline 20 is similarly fed.

In the two embodiments above described, the engine speed and the degree of opening of the throttle have been used as parameters. With these parameters, the grid contains only three zones and the act of changing the ratio brings the feeler to within the zone of proper operation since the speed of the engine is changed. It should be noted that when the extreme ratios are used (1st and 4th in a four-speed gearbox), the feeler may be situated in the zones $S_1$ (when the 1st speed is used) or $S_2$ (when the 4th speed is used) without having an effective role, since in the first case it is not possible to reduce the speed and in the second case to increase the speed.

Finally, by using parameters other than those used in the foregoing examples it may be necessary to have a grid of a totally different appearance. That is the case when the engine speed is replaced by the vehicle speed. The grid then has the form shown diagrammatically in Figure 4, where the curve $L_1$ corresponds to favourable conditions by changing gear up from 1st to 2nd gear; the curve $L_2$ indicates changing gear up from 2nd to 3rd gear; the curve $L_3$ indicates changing up from 3rd to 4th gear; the curve $L_4$ indicates changing down from 4th to 3rd gear; the curve $L_5$ changing down from 3rd to 2nd gear; and the curves $L_6$ indicates changing down 2nd to 1st gear.

In this case, the act of changing gear or transmission ratio does not modify the position of the feeler, and it is no longer "zones" which give the signal, but the various curves shown.

I claim:

1. A device for indicating the performance of a vehicle comprising first means for controlling at least one parameter affecting the operation of the vehicle, second means for indicating at least one type of response of the vehicle to the control of its operation, a device including detectable representations of optimum and undesirable ratios between the parameter and response, said device being coupled to one of said means and being positioned thereby, and a detector coupled to the other of said means and being in movable engagement with said device, said detector being moved by the latter said means in accordance with the response of said vehicle whereby the relative movements of the device and detector continuously detect the ratio between the parameter and response wherein the first means is a throttle controlling fuel feed in the vehicle.

2. A device for indicating the performance of a vehicle comprising first means for controlling at least one parameter affecting the operation of the vehicle, second means for indicating at least one type of response of the vehicle to the control of its operation, a device including detectable representations of optimum and undesirable ratios between the parameter and response, said device being coupled to one of said means and being positioned thereby, and a detector coupled to the other of said means and being in movable engagement with said device, said detector being moved by the latter said means in accordance with the response of said vehicle whereby the relative movements of the device and detector continuously detect the ratio between the parameter and response wherein the second means comprises a pump operated in accordance with the speed of the vehicle, and a cylinder and piston arrangement coupled to and controlled by the pump, said detector being coupled to and moved by said piston.

References Cited in the file of this patent

UNITED STATES PATENTS 2,530,351    Fales _____ Nov. 14, 1950

FOREIGN PATENTS 353,550    Great Britain _____ July 30, 1931